US007905366B2

(12) United States Patent
Jaede (10) Patent No.: US 7,905,366 B2
(45) Date of Patent: Mar. 15, 2011

(54) ENERGY DISSIPATION DEVICE FOR A MULTI-MEMBER VEHICLE

(75) Inventor: Eckart Jaede, Braunschweig (DE)

(73) Assignee: Voith Patent GmbH (DE)

( * ) Notice: Subject to any disclaimer, the term of this patent is extended or adjusted under 35 U.S.C. 154(b) by 588 days.

(21) Appl. No.: 11/873,803

(22) Filed: Oct. 17, 2007

(65) Prior Publication Data
US 2009/0000506 A1 Jan. 1, 2009

(30) Foreign Application Priority Data

Oct. 19, 2006 (EP) .................................. 06 122 601
Nov. 23, 2006 (EP) .................................. 06 124 641

(51) Int. Cl.
*B61G 9/00* (2006.01)
*B61D 15/06* (2006.01)
*B60R 19/04* (2006.01)
(52) U.S. Cl. ........... 213/7; 213/221; 105/392.5; 293/154
(58) Field of Classification Search .................. 213/1 R, 213/1 A, 7, 40 R, 220–222; 293/133, 154, 293/155; 105/392.5
See application file for complete search history.

(56) References Cited

U.S. PATENT DOCUMENTS

| 3,577,621 A | 5/1971 | DeGain |
| 3,981,114 A * | 9/1976 | Chupick ........................ 52/232 |
| 4,272,114 A * | 6/1981 | Hirano et al. .................. 293/133 |
| 6,196,135 B1 | 3/2001 | Kashima et al. |
| 6,705,653 B2 * | 3/2004 | Gotanda et al. ............... 293/132 |
| 6,820,924 B2 * | 11/2004 | Caliskan et al. ......... 296/187.03 |
| 6,908,130 B2 * | 6/2005 | Reutlinger et al. ........... 293/155 |
| 7,201,413 B2 * | 4/2007 | Hillekes et al. ............... 293/133 |
| 7,204,531 B2 * | 4/2007 | Kim ................................ 293/120 |
| 7,357,445 B2 * | 4/2008 | Gross et al. .............. 296/187.09 |
| 2001/0039822 A1 | 11/2001 | Minamidate et al. |

OTHER PUBLICATIONS

International Search Report, PCT No. PCT/EP2007/061114, dated Feb. 1, 2008, 6 pages.
European Search Report, Patent No. 06124641.9-2422, dated Feb. 29, 2008, 3 pages.

* cited by examiner

*Primary Examiner* — S. Joseph Morano
*Assistant Examiner* — Robert J McCarry, Jr.
(74) *Attorney, Agent, or Firm* — Cesari and McKenna, LLP; John F. McKenna (57) ABSTRACT

The invention relates to an energy dissipation device (100) for a multi-member vehicle, a rail-mounted vehicle in particular, comprising a first end plate (10), a second end plate (20) and an energy dissipation element (30) in the form of a hollow body extending in the longitudinal direction (L) of the energy dissipation device (100) and arranged between the first and the second end plate (10, 20), whereby to prescribe the formation of folds for the energy dissipation element (30) upon activation of the energy dissipation device (100), said energy dissipation element (30) comprises a response trigger in the form of a fold/bulge area (33, 33') extending peripherally at least partly around the periphery of the hollow body. In order to ensure that the energy dissipation device (100) can be utilized to transfer both compressive forces as well as tractive forces, the invention provides for the energy dissipation device (100) to comprise at least one tractive force-transferring element (31) which connects the first end plate (10) to the second end plate (20) and is designed to transfer tractive forces in the longitudinal direction (L) of the energy dissipation device (100), whereby the line of action (W2) for the tractive force transferred over the at least one tractive force-transferring element (31) runs completely through the interior of said tractive force-transferring element (31).

17 Claims, 10 Drawing Sheets

ENERGY DISSIPATION DEVICE FOR A MULTI-MEMBER VEHICLE

The present invention relates to an energy dissipation device for a multi-member vehicle, a rail-mounted vehicle in particular, whereby the energy dissipation device comprises a first end plate, a second end plate, and an energy dissipation element in the form of a hollow body extending in the longitudinal direction of the energy dissipation device and arranged between the first and the second end plate, and whereby to prescribe the formation of folds for the energy dissipation element upon activation of the energy dissipation device, the energy dissipation element further comprises a response trigger in the form of a fold/bulge area extending peripherally at least partly around the periphery of the energy dissipation element configured as a hollow body. The invention further relates to a method for manufacturing such an energy dissipation device.

Energy dissipation devices of a type according to this principle as cited above are generally known in the prior art and are used for example in railway technology, in particular as shock absorbers. Usually a shock absorber of this type comprises a combination of a drawgear (for example in the form of a spring apparatus) and an energy dissipation device, and serves to protect the vehicle in particular also at greater speeds of impact. The drawgear is usually designed to accommodate tractive and impact forces up to a defined magnitude and conduct any forces exceeding that to the vehicle underframe.

Thus, tractive and impact forces which occur in a multi-member rail vehicle during normal vehicle operation, for example between the individual car bodies, are absorbed by the normally regeneratively-configured shock absorber.

However, upon the operating load of the normally regeneratively-configured drawgear being exceeded, for instance upon the vehicle colliding with an obstacle or upon a sudden braking of the vehicle, the drawgear and also the articulated or coupling connection as may be provided between the individual car bodies, the interface between the individual car bodies respectively, may conceivably be destroyed or damaged. In any case, the drawgear is inadequate to absorb the whole of the resultant energy. Hence, the drawgear is then no longer incorporated into the energy-dissipating concept of the vehicle as a whole such that—provided no additional energy dissipation device has been provided—the resulting impact energy is transferred directly to the vehicle underframe. Doing so subjects same to extreme loads and may possibly damage or even destroy same. With multi-member rail vehicles in such cases, there is the risk of car body derailment.

A destructively or regeneratively configured energy dissipation element is frequently used as an additional energy dissipation device with the objective of protecting the vehicle underframe against damage from severe impacts, same being designed for example so as to activate when the drawgear's operational absorption is exhausted and will at least partly absorb, and thus dissipate, a portion of the energy transferred over the energy dissipation element by the force flow. Especially conceivable as energy dissipation elements are deformation bodies which convert the impact energy into work of deformation and heat by a (desired) destructive plastic deformation upon a critical compressive force being exceeded.

An energy dissipation element which uses a deformation tube to convert the impact energy exhibits an essentially oblong characteristic curve, whereby maximum energy absorption is ensured upon activation of said energy dissipation element.

It is, however, frequently not possible at the present time for an energy dissipation device which uses a destructively-configured energy dissipation element—for example in the form of a deformation tube—to be adapted to specific given applications with sufficient precision, in particular in terms of the response characteristics of the energy dissipation device. Required here would be configuring the response characteristics and the force-path characteristic of the energy dissipation device accordingly, as well as pre-defining the sequence of events for the energy dissipation so as to enable a predictable, defined dissipation of energy.

An energy dissipation device of the type cited at the outset is known from WO 00/05 119 A1 in which a connecting body in the form of a box-like body extending in the longitudinal direction of the energy dissipation device is arranged between a first and a second joint plate (end plate). This box-like body assumes the function of a deformation body which loses its force-transmitting function by the axial collapsing of folds upon the characteristic triggering force being exceeded. Collapsing of the box-like connecting body ensues in that the respectively adjacent sides of the box-like connecting body alternatingly bulge or dent inward or outward.

A trigger is furthermore provided in the known energy dissipation device to prescribe the formation of folds in the box-like connecting body upon activation of the energy dissipation device. With this response trigger, design-contingent geometrical imperfections are provided in the form of beveled edges at those locations at which the first fold should develop upon activation of the energy dissipation device.

Providing such response triggering thus results in an energy dissipation device with which the course of events involved in energy dissipation in the event of a crash runs according to a predefinable pattern; i.e. upon activation of the energy dissipation device. Yet the energy dissipation device as described above and known from WO 00/05 119 A1 has the disadvantage that when manufacturing the box-like connecting body which serves as the energy dissipation element, the individual sheets which form the walls of the connecting body in assembled state, first require relatively complex machining, i.e. prior to welding the individual sheets as necessary to form the box-like connecting body. Particularly necessary is folding a predefined end piece of each individual sheet by a specific angle at a precise bending line so that the beveled edge can actually serve as a trigger to prescribe the formation of folds for the connecting body upon activation of the energy dissipation device.

Particularly not to be precluded with the known prior art solution is the fact that any imperfections as may arise when manufacturing the box-like connecting body—in terms of, for example, the bending line over which the end pieces are folded or the angle at which the end pieces need to be bent—can negatively impact the response characteristics of the energy dissipation element.

A further disadvantage with the known solution is noted in that by providing the response trigger in the form of a design-contingent beveled edge, the energy dissipation device is not or is at least only conditionally designed to transfer the tractive forces occurring in normal vehicle operation. Such tractive forces would then affect the fold area provided as the response trigger, in consequence of which the response characteristics of the energy dissipation device would then no longer be precisely predefinable.

Thus, the task which the present invention addresses is that of further developing an energy dissipation device having a destructively-functioning energy dissipation element of the type cited at the outset such that the energy dissipation device can be utilized to transfer both compressive as well as tractive forces and thus be, for example, arranged downstream of an articulated or coupling arrangement for a multi-member rail vehicle. In the process, both the response force for triggering the energy dissipation as well as the course of events during the energy absorption should moreover be precisely adjustable whereby at the same time the energy dissipation device should be designed to be as simple and economical as possible to manufacture. The present invention furthermore addresses the task of indicating a method for manufacturing such an energy dissipation device.

As regards the energy dissipation device, the underlying task is solved in accordance with the invention in that the energy dissipation device of the type cited at the outset further comprises at least one tractive force-transferring element which connects the first end plate with the second end plate and is designed to transfer tractive forces in the longitudinal direction of the energy dissipation device, whereby the line of action for the tractive force transferred over the at least one tractive force-transferring element runs completely through the interior of the tractive force-transferring element, i.e. over the entire length of the tractive force-transferring element.

The solution according to the invention exhibits a number of substantial advantages, the details of which will be addressed in the following. For instance, by providing the response trigger to prescribe the formation of folds for the energy dissipation element configured as a hollow body, the sequence of events upon energy dissipation; i.e. the plastic deformation of the energy dissipation element upon activation of the energy dissipation device, can be precisely set in advance. To wit, the providing of a geometrical imperfection in the form of a fold/bulge area in the wall of the energy dissipation element configured as a hollow body has the effect that the position, alignment as well as the formation of the first fold for the axial collapsing of folds of the energy dissipation element configured as a hollow body occurring during the energy dissipation is substantially less dependent on material irregularities in the energy dissipation element as would be the case were the energy dissipation device not to exhibit any such response triggering.

On the other hand, the energy dissipation device according to the invention is provided with an additional tractive force-transferring element which primarily serves to conduct the tractive forces occurring during normal vehicle operation in the longitudinal direction of the energy dissipation device. This thereby has the effect that the tractive force component to be transmitted which runs through the wall of the energy dissipation element configured as a hollow body is sufficiently reduced so that there is no change to the fold/bulge area provided as the response trigger and thus also no effect on the response characteristics of the energy dissipation device in the event of a crash; i.e. upon the transfer of excessive impact force. What is essential in the process is that the at least one tractive force-transferring element is situated entirely on one of the connecting lines connecting the first end plate with the second end plate so that the line of action for the tractive force transferred via the tractive force-transferring element runs completely within the interior of said tractive force-transferring element. With this measure, the tractive force-transferring element is designed so as to transfer tractive forces without the energy dissipation element with the fold/bulge area provided as the response trigger elongating as a result of the tractive force component running through the wall of the energy dissipation element configured as a hollow body. Thus the at least one tractive force-transferring element increases the tensile strength of the energy dissipation device as a whole so that the energy dissipation device can also transfer higher tractive forces.

Various different components made from a rigid material and having sufficient and preferably known tensile strength are conceivable as the tractive force-transferring element. Rods, bars, cables or ties, etc., are particularly conceivable as tractive force-transferring elements. The use of a tractive force-transferring element designed as a cable or chain is particularly distinguished by said tractive force-transferring element only being designed to transfer tractive forces in the longitudinal direction of the energy dissipation device while not being able to transfer impact forces. In such a case, the impact forces run wholly through the energy dissipation element configured as a hollow body.

To manufacture such an energy dissipation device, a method is provided according to the invention which comprises the following procedural steps: first a hollow body is provided with a canted, in particular truncated-pyramid form. A first end plate is then attached to a first end face of the hollow body and a second end plate to an oppositely-arranged second end face of the hollow body. A fold/bulge area peripherally extending at least partly around the periphery of the hollow body is thereafter formed in the wall of the hollow body and constitutes the response trigger in the finished energy dissipation device. Lastly, at least one tractive force-transferring element is secured both to the first end plate as well as the second end plate such that the entire length of the at least one tractive force-transferring element is situated on a connecting line connecting the first end plate with the second end plate.

This results in an especially simple to realize method for manufacturing the inventive energy dissipation device, which is in particular distinguished in that the fold/bulge area peripherally extending at least partly around the periphery of the hollow body is not formed until after the hollow body is manufactured. It is therefore not necessary to change the hollow body manufacturing process sequence since it is not necessary to provide the individual sheets forming the walls of the hollow body with geometrical imperfections (beveled edges, etc.) prior to assembling the hollow body. According to the invention, the fold/bulge area is instead not formed in the walls of the hollow body until after the hollow body as such is finished and the end plates have been attached to the respective end faces of the hollow body.

Advantageous embodiments of the inventive solution are indicated in the subclaims.

A preferred embodiment of the inventive energy dissipation device with respect to the at least one tractive force-transferring element used to increase the tensile strength of the energy dissipation device thus provides for same to have a predefinable flexural rigidity.

The term "flexural rigidity" as used here is to be generally understood as a dimension known in engineering mechanics which specifies the correlation between a load acting on the tractive force-transferring element and the elastic deformation acting on the tractive force-transferring element due to this load. The flexural rigidity of the tractive force-transferring element is dependent upon the form, the geometry and the material of the transfer element. Specifically, the flexural rigidity of the tractive force-transferring element represents the product of the elastic modulus of the material used for the transfer element and the second moment of area for the cross-section of the tractive force-transferring element. The second moment of area thereby fundamentally depends on the design to the cross-sectional area.

Since the at least one tractive force-transferring element exhibits a predefinable flexural rigidity in the preferred embodiment, the characteristic buckling load for the tractive force-transferring element is also known. This relates to the critical force at which the tractive force-transferring element loses its stability upon compressive force transmission by giving way laterally (from the connecting lines) and fails as a force transmission element. As the material and/or the cross-sectional profile to the tractive force-transferring element is selected accordingly, the characteristic buckling load for the tractive force-transferring element can, for example, be predefined as such. This is particularly advantageous in terms of defining the characteristic response force for the energy dissipation device. If, for example, a rod, bar or band-shaped element of a rigid material is namely used as the tractive force-transferring element, consideration must be made of the fact that this tractive force-transferring element is not only designed so as to transmit tractive forces and thus increase the tensile strength of the energy dissipation device as a whole, but also exhibits a certain compressive strength so that the compressive forces transmitted by the energy dissipation device also run to some extent through the tractive force-transferring element. In such a case, in order to precisely predict and predefine the response characteristic of the energy dissipation element configured as a hollow body, it is necessary to know in advance the component transferred through the tractive force-transferring element during transmission of the force.

So that the force component transferred through the tractive force-transferring element upon compressive force transmission is as low as possible, the tractive force-transferring element should preferably exhibit a smaller cross-section in comparison to the walls of the energy dissipation element configured as a hollow body.

As already indicated, it is in principle preferable for the tensile strength of the at least one tractive force-transferring element to also be adjustable, and thus known, by means of an appropriate material selection and an appropriate selection of the cross-sectional dimension to said tractive force-transferring element. It is thus possible to specify in advance the maximum tractive force which can be conducted by the energy dissipation device. By so doing, the energy dissipation device can be optimally adjusted to the respective application. The tensile strength is the tension calculated in a tensile test from the maximum tractive force related to the original cross-sectional area of the tractive force-transferring element.

A particularly preferred realization of the inventive solution makes use of at least two tractive force-transferring elements which respectively extend along different connecting lines, whereby the resultant of the connecting lines coincides with the longitudinal axis of the energy dissipation device. This has the advantage that when tractive forces are transmitted over the at least two tractive force-transferring elements, no spikes in the stress load can occur and, in particular, the tractive forces to be transmitted via the energy dissipation device can also be conducted in even distribution across the cross-section of the energy dissipation device. This measure can also effectively prevent a deformation (distending) of the energy dissipation element configured as a hollow body with the fold/bulge area integrated into the walls of the hollow body upon increased tractive forces being transferred.

Particularly preferred in a further embodiment of the tractive force-transferring elements used in the energy dissipation device as proposed by the invention is that they extend along connecting lines which run transverse to the longitudinal axis of the energy dissipation device. In extreme cases, it is thus conceivable for the individual tractive force-transferring elements to run diagonally from the one side of the energy dissipation element configured as a hollow body to the opposite other side. The angled arrangement of the tractive force-transferring elements relative the longitudinal axis of the energy dissipation element has an effect on the characteristic buckling load at which the tractive force-transferring element loses its stability upon compressive force transmission by giving way laterally and fails as a force transmission element.

This draws on the recognition that among the factors on which the characteristic buckling load for the tractive force-transferring element is dependent is the type of compressive stress; i.e. the type of compressive force transmitted in the tractive force-transferring element and the path taken by the compressive forces over the length of the tractive force-transferring element. According to the stability theory, the characteristic buckling load $F_K$ can be calculated with the following formula:

$$F_K = \frac{\pi^2 EI}{s^2} \qquad \text{(Equation 1)}$$

In Formula 1, E designates the elastic modulus for the materials used for the tractive force-transferring element, I the axial geometric moment of inertia for the cross-sectional area of the tractive force-transferring element and s the so-called buckling length which has the following relationship to the length L of the tractive force-transferring element:

$$s = \beta \cdot L \qquad \text{(Equation 2)}$$

In Formula 2, $\beta$ designates the so-called buckling coefficient with which the influence of the type of compressive stress occasions on the characteristic buckling load. The buckling coefficient hereby also depends in particular on the angle at which the connecting lines of the tractive force-transferring element run relative the longitudinal axis of the energy dissipation device.

When the at least one tractive force-transferring element is thus connected at its ends to the corresponding end plates of the energy dissipation device at a non-rectangular or non-orthogonal angle, the buckling length coefficient to be drawn on when calculating the characteristic buckling force changes such that despite a constant elastic modulus, the characteristic buckling force for the tractive force-transferring element decreases. A tractive force-transferring element which extends along connecting lines running transverse to the longitudinal axis of the energy dissipation device can thus exhibit relatively low flexural rigidity despite high tensile strength.

The advantage of a transverse arrangement to the tractive force-transferring elements relative the longitudinal axis of the energy dissipation device can thus be seen in that at the same tensile strength, the flexural rigidity of the tractive force-transferring element can be reduced so that upon the transmission of compressive forces, only a lesser compressive force component runs through the tractive force-transferring element compared to the energy dissipation element configured as a hollow body.

With the energy dissipating device according to the invention, the energy dissipation element configured as a hollow body should in principle be advantageously designed to transfer compressive forces up to a predefined amount of energy through the force flow over the hollow body in the longitudinal direction of the energy dissipation device. In so doing, the line of action for the compressive forces transferred through the energy dissipation element—with the exception of the fold/bulge area—extends completely within the walls of the energy dissipation element configured as a hollow body. This then namely assures that the fold/bulge area, which is peripherally configured at least partly around the periphery of the hollow body, is provided as the only geometrical imperfection in the energy dissipation element so that a precisely adjustable response trigger for the formation of folds in the energy dissipation element is then possible upon the characteristic response force for the energy dissipation device being exceeded.

With regard to the response characteristics for the energy dissipation device and to the sequence of events during energy absorption, a particularly preferred realization of the solution according to the invention provides for the energy dissipation element configured as a hollow body to have a tapering profile, and preferably a profile tapering from the first end plate toward the second end plate. This conical design has the advantage of increased stability to the hollow body relative lateral forces and moments and relative eccentric longitudinal forces. In conjunction hereto, it would for example be conceivable that the hollow body exhibit a canted profile such as, for example, the shape of a truncated pyramid.

In the latter realization of the solution according to the invention as described in which the hollow body exhibits a canted profile, it is advantageous to provide a recess or a cutout on at least one edge, and preferably at each edge of the connecting body, situated in or at least partly in the fold/bulge area. These recesses or cutouts at the edges of the truncated pyramid serve in preventing the edges of the hollow body from being able to effect any natural reinforcing of the energy dissipation element in the fold/bulge area; i.e. in the area in which the first fold is formed in the energy dissipation element configured as a hollow body upon activation of the energy dissipation device. Upon activation, the energy dissipation device can thus form this first fold in a defined manner. Furthermore, the provision of the recesses or cutouts has the effect that any spikes in the triggering force necessary to activate the energy dissipation device can be attenuated.

Preferably provided with an energy dissipation device according to the previously-described realizations of the inventive solution of a hollow body having a tapering profile is that the fold/bulge area is arranged on the tapered side of said hollow body in order to able to adjust the characteristic response force for triggering the energy dissipation device in a particularly precise manner. The tapering profile to the hollow body thereby assumes a so-called "focusing function" since the mechanical compressive stress occurring upon transmission of impact forces through the energy dissipation device is most strongly pronounced on the tapered end of the hollow body.

Yet other configurations are of course also conceivable for the fold/bulge area with regard to the hollow body. In particular, a corresponding response trigger can also be provided on both ends of the hollow body or also even in the middle of the hollow body.

Lastly, a particularly preferred use of the energy dissipation device according to the invention provides for the first end plate to be configured as a first joint plate via which the energy dissipation device can be attached, preferably detachably, to the main frame of a vehicle body of a multi-member vehicle (in particular rail vehicle). Alternatively or additionally hereto, it is advantageous for the second end plate to also be configured as a (second) joint plate, via which at least one upstream component of the energy dissipation device such as a force transmission element, a buffer element or an additional shock absorber, is preferably detachably connected to the energy dissipation device.

With regard to the claimed method for manufacturing the energy dissipation device according to the invention, a further embodiment provides for applying a compressive stress to the hollow body such that a buckling occurs transverse to the load in a defined manner at least partly around the periphery of the hollow body so as to form the fold/bulge area extending peripherally at least partly around the periphery of the hollow body. It is preferred for the amount of the compressive stress applied to the hollow body to be selected such that the bulging can be set at a definable amplitude. Since the edges of the hollow body represent reinforcements with respect to the characteristic buckling load of the hollow body, a hammock effect occurs upon application of the compressive stress transverse to the load, with which the sides of the hollow body plastically bulge outward and thus form the bulge. In the process, the amount of the compressive stress applied to the hollow body should be greater than the branching load of the individual sides of the hollow body and less than the supercritical load capacity of the hollow body as a function of the reinforced edges. This bulge is a component of the response trigger of the finished energy dissipation device. As the amplitude of the bulge is formed in a defined manner by the application of a precalculated or otherwise defined compressive stress, the charac-teristic force level for the activation of the finished energy dissipation device can be preset.

Alternatively or additionally to the previously cited embodiments in which a compressive stress is applied to the hollow body to form the fold/bulge area extending peripherally at least partly around the periphery of the hollow body, a preferred realization of the inventive method provides for, prior to the method step of forming at least one peripherally-extending fold/bulge area at least partly around the periphery of the hollow body, the securing of at least one traction element, in particular a tie rod, to the wall of the hollow body at two oppositely-arranged fixing points inside the hollow body such that the traction element extends transverse to the longitudinal direction of the hollow body. This traction element thereby serves as a response safeguard which interacts with the hollow body such that after said response safeguard is triggered, at least one first bulge/fold extending peripherally at least partly about the periphery of the connecting body is formed, whereby this at least one first bulge/fold serves as the trigger for prescribing the formation of the folds for the energy dissipation element configured as a hollow body upon activation of the energy dissipation device.

In the latter cited preferred embodiment of the method according to the invention, it is additionally provided to advance a manipulator into the interior of the connecting body for forming the fold/bulge area extending peripherally at least partly around the periphery of the hollow body so that the traction element is preferably concentrically compressed and the two oppositely-arranged fixing points moved relative to one another.

This is hereby an especially easy to realize yet effective solution to manufacture an energy dissipation device with an integrated response safeguard. By advancing the manipulator into the interior of the connecting body such that preferably the center area of the traction element is compressed and thus the two oppositely-arranged fixing points moved relative to one another, the respective fixing points form an indentation extending peripherally at least partly around the periphery of the hollow body with a bulge direction toward the middle of the hollow body. It is evident with this preferred embodiment that the amplitude of the first indentation introduced as such and thus the response force for the energy dissipation device can be set in that the magnitude of the compression effected by the manipulator of the area of the traction element between the oppositely-arranged fixing points can be set. Of course, other embodiments are also conceivable for the response safeguard.

With respect to the fixing of the at least one traction element to the hollow body of the energy dissipation device, it is preferably provided that the at least one traction element provided in the interior of the hollow body is force-fit, form-fit and/or integrally bonded to the inner wall of the connecting body at two oppositely-arranged fixing points. Yet on the other hand, it is also conceivable for the at least one traction element provided inside the hollow body to be connected to the outer wall of the hollow body at two oppositely-arranged fixing points and to run accordingly from the respective fixing points through openings in the wall of the hollow body. This type of anchoring is a particularly easily realized solution.

With respect to the displaceable manipulator inside the hollow body, serving to compress the at least one traction element provided inside said hollow body, it is preferable for same to exhibit a pin at its head area, whereby this pin together with the head area is displaceable through a corresponding opening in the first or second end plate relative the energy dissipation device in the longitudinal direction of same.

Finally, with respect to the inventive method, it is further preferred for the at least one traction element to then be removed again from the interior of the hollow body after the fold/bulge area is formed in the hollow body so that it cannot negatively influence the response characteristics of the energy dissipation device or the sequence of events in energy absorption.

Preferred embodiments of the inventive solution will be described below by drawing on the figures as herewith included.

Shown are:

FIGS. 1 to 6 show different views of a preferred embodiment of the inventive energy dissipation device 100. This energy dissipation device 100 is particularly suited as a shock absorber, preferably in combination with a (not explicitly shown) drawgear, to protect the vehicle underframe of a multi-member rail vehicle.

As shown, the energy dissipation device 100 comprises a first and a second end plate 10, 20, each respectively assuming the function of a force transmission element. The two end plates 10, 20 are each respectively configured as a rectangular joint plate in the preferred embodiment of the inventive energy dissipation device 100. The invention is, of course, obviously not limited to the end plates 10, 20 being of such a design or form.

Figure 5:
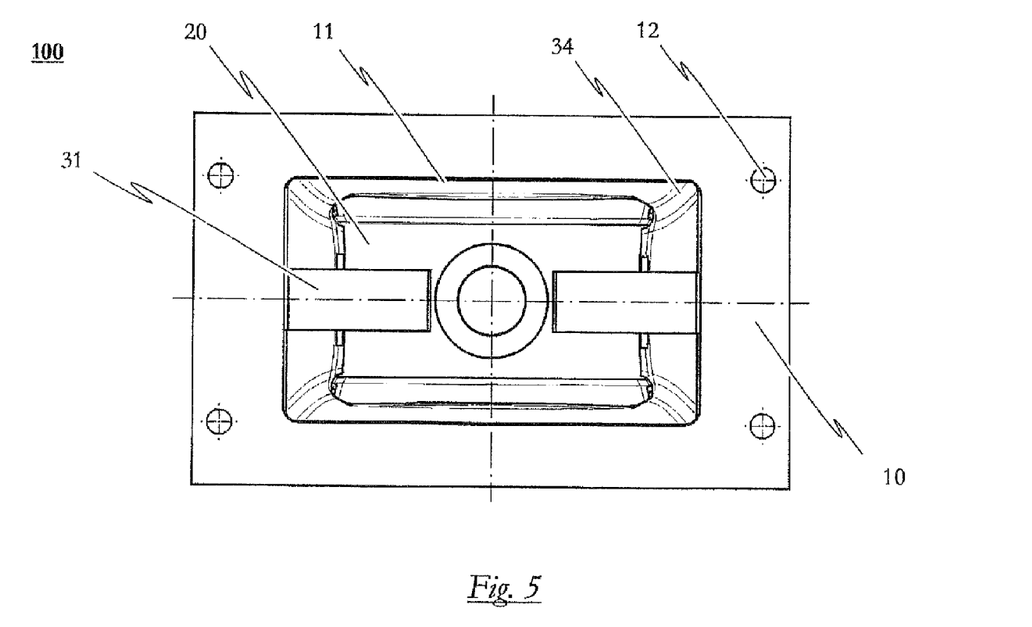
FIG. 5: a frontal view onto the first end plate of the preferred embodiment of the energy dissipation device according to the invention.

The first end plate 10 is designed so as to attach the energy dissipation device 100 to a (not shown) main frame of a vehicle body; to this end corresponding fixing means 12 are provided on the first end plate 10 in the form of through holes.

Figure 6:
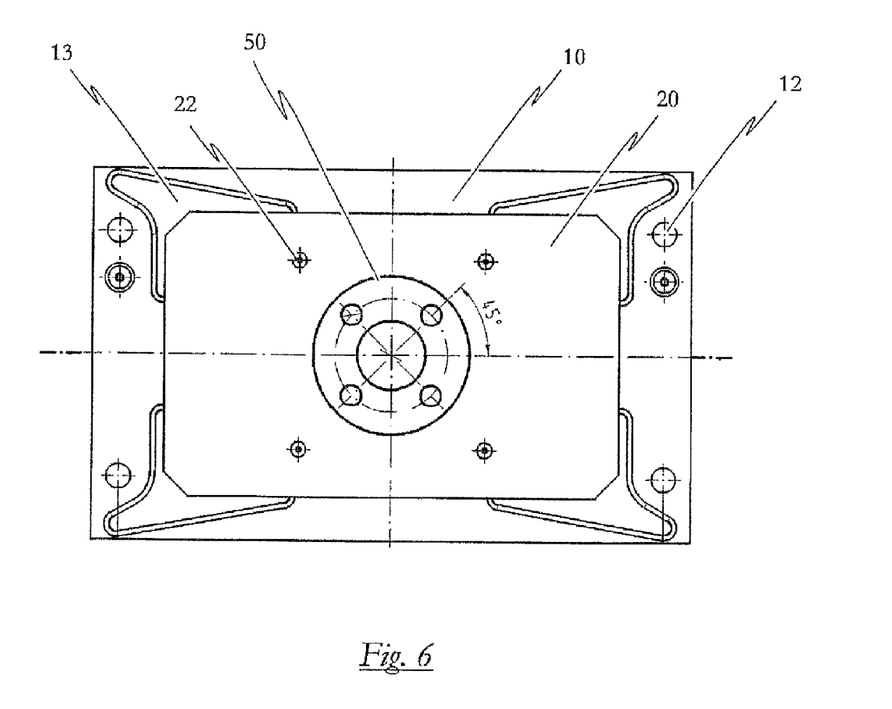
FIG. 6: a frontal view onto the second end plate of the preferred embodiment of the energy dissipation device according to the invention.

On the other hand, the second end plate 20 of the embodiment as depicted is designed such that at least one (not shown) upstream element, such as for instance a further energy dissipation element, can be attached to the energy dissipation device 100 by means of the second plate 20 configured as a joint plate. Again, the appropriate fixing means 22 are provided on the second end plate 20 for this purpose.

As indicated above, especially conceivable as fixing means 12, 22 are through holes which respectively extend through the first/second end plates 10, 20 and which are designed to receive a bolt, a pin or the like, which ultimately serve to affix the energy dissipation device 100 to the main frame of the vehicle body or to affix an upstream element to the energy dissipation device 100.

In place of the through holes, however, other solutions are also feasible for the fixing means 12, 22. If, for example, contingent upon the design, at least one of the two end plates 10, 20 can only be provided with a comparatively smaller edge area in which there is insufficient space for the appropriate through holes, or insufficient space for bolts, etc. to be received in such through holes, the rear side of the corresponding end plates 10, 20; i.e. on the side of the end plates 10, 20 facing away from the energy dissipation element 30, lend themselves to a standpipe or the like being attached by welding or otherwise affixing, whereby this standpipe ultimately serves to affix the energy dissipation device 100 to the main frame of the vehicle body, to affix an upstream element to the energy dissipation device 100 respectively. It would hereby be conceivable for a corresponding connecting element to be arranged in or on the free end of the standpipe to form a force-fit, integrally-bonded and/or form-fit connection with the main frame of the vehicle body, the upstream element respectively.

Additionally to the first and second end plate 10, 20, the energy dissipation device 100 further comprises an energy dissipation element 30 in the form of a hollow body extending in the longitudinal direction L of the energy dissipation device 100. The hollow body of the energy dissipation element 30 serves as a deformation body for the depicted energy dissipation device 100 to convert by means of plastic deformation, and thus absorb, at least a portion of the energy transferred over energy dissipation device 100 into heat energy and work of deformation upon activation of the energy dissipation device 100.

The two end plates 10, 20 and the energy dissipation element 30 are connected together without play such that tractive and impact forces can be transferred in the longitudinal direction L of the energy dissipation device 100, whereby the force flow occurring in the transmission of the forces extends at least partly through the wall of the energy dissipa-tion element 30 configured as a hollow body. Conceivable hereby would be for the two end plates 10, 20 to connect to the respective end faces of the energy dissipation element 30 configured as a hollow body. It is hereby advantageous to configure a circumferential groove in the respective end plates 10, 20 which receives the respective end face of the energy dissipation element 30 configured as a hollow body. Alternatively or additionally hereto, the end plates 10, 20 can also be designed as suitably appropriate limit stops 13 serving to receive the energy dissipation element 30 configured as a hollow body. In the embodiment as depicted, such limit stops 13 are formed on the first end plate 10.

Appropriately selecting the wall thickness for the energy dissipation element 30 configured as a hollow body as well as appropriately selecting the material for said hollow body assures that the energy dissipation element 30 can accord a force transmission function in contending with up to a definable amount of energy transferred by the force flow over the energy dissipation element 30 ensuing from an impact so that the two end plates 10, 20 are essentially rigid to one another.

On the other hand, the energy dissipation element 30 configured as a hollow body loses its force transmission function upon the exceeding of a definable amount of energy being transferred by the force flow over the wall of the hollow body so that the two end plates 10, 20 are then moved relative to one another in the longitudinal direction L of energy dissipation device 100. In this case, at least a portion of the amount of energy transferred by the energy dissipation element 30 is converted into work of deformation and heat by the plastic deformation of the hollow body and thus dissipated.

The plastic deformation of the hollow body effected subsequent the activation of the energy dissipation element 30 configured as a hollow body occurs in the form of an axially-extending collapsing of folds, whereby progressively proceeding parallel folds result in the longitudinal direction L of the energy dissipation device 100.

In order to achieve that the folds form in a defined, predictable manner subsequent activation of the energy dissipation element 30 and thus enable a pre-definable sequence of events in terms of the effected energy dissipation (in particular at a precisely predictable response force), it is provided for the energy dissipation element 30 to comprise a response trigger in the form of a fold/bulge area 33 extending peripherally at least partly around the periphery of the hollow body. This fold/bulge area 33 serves to prescribe the formation of folds for the energy dissipation element 30 configured as a hollow body upon activation of said energy dissipation element 30.

Specifically, the energy dissipation element 30 in the preferred embodiment is configured in the form of a canted, truncated-pyramid body which exhibits a shape tapering from the first end plate 10 toward the second end plate 20. Here, the response trigger in the form of the fold/bulge area 33 is provided in the wall of the truncated pyramid on the smaller cross-sectional end of the energy dissipation element 30. Cutouts or recesses 35 are further provided at the edges 34 of the hollow body 30 at the height of the fold/bulge area 33.

These cutouts 35 at the edges 34 of the energy dissipation element 30 of truncated pyramid form serve in preventing the edges 34 of the hollow body 30 from effecting any natural reinforcing of the energy dissipation elements 30 at the height of the fold/bulge area 33 and allow the defined forming of the fold/bulge area 33 by the advancing of a manipulator 40 (described below). Achieved in particular is being able to reduce spikes in the stress load upon triggering of the energy dissipation element 30 provided in the energy dissipation device 100.

Figure 1:
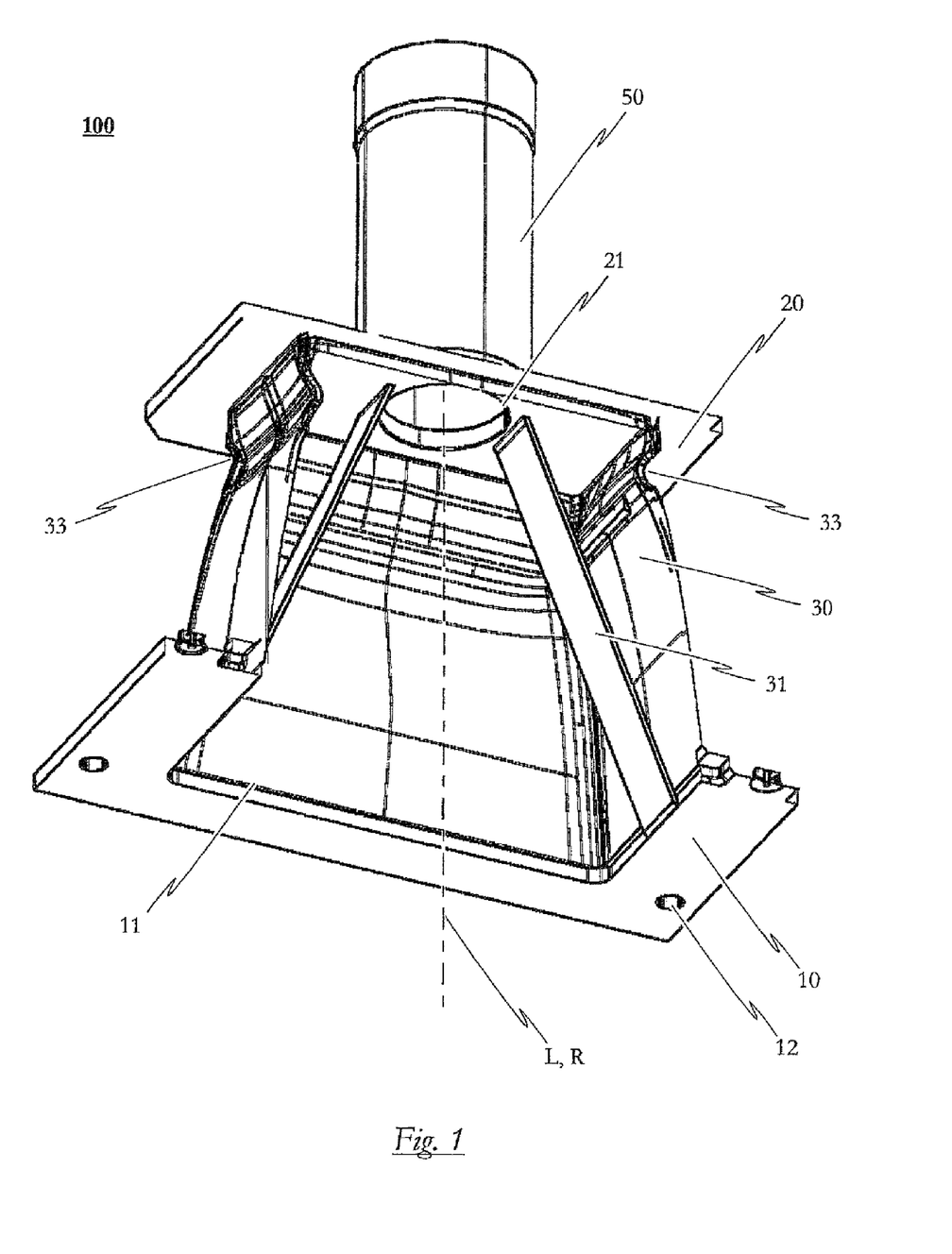
FIG. 1: a partly sectional perspective view of a preferred embodiment of the energy dissipation device according to the invention.
Figure 2:
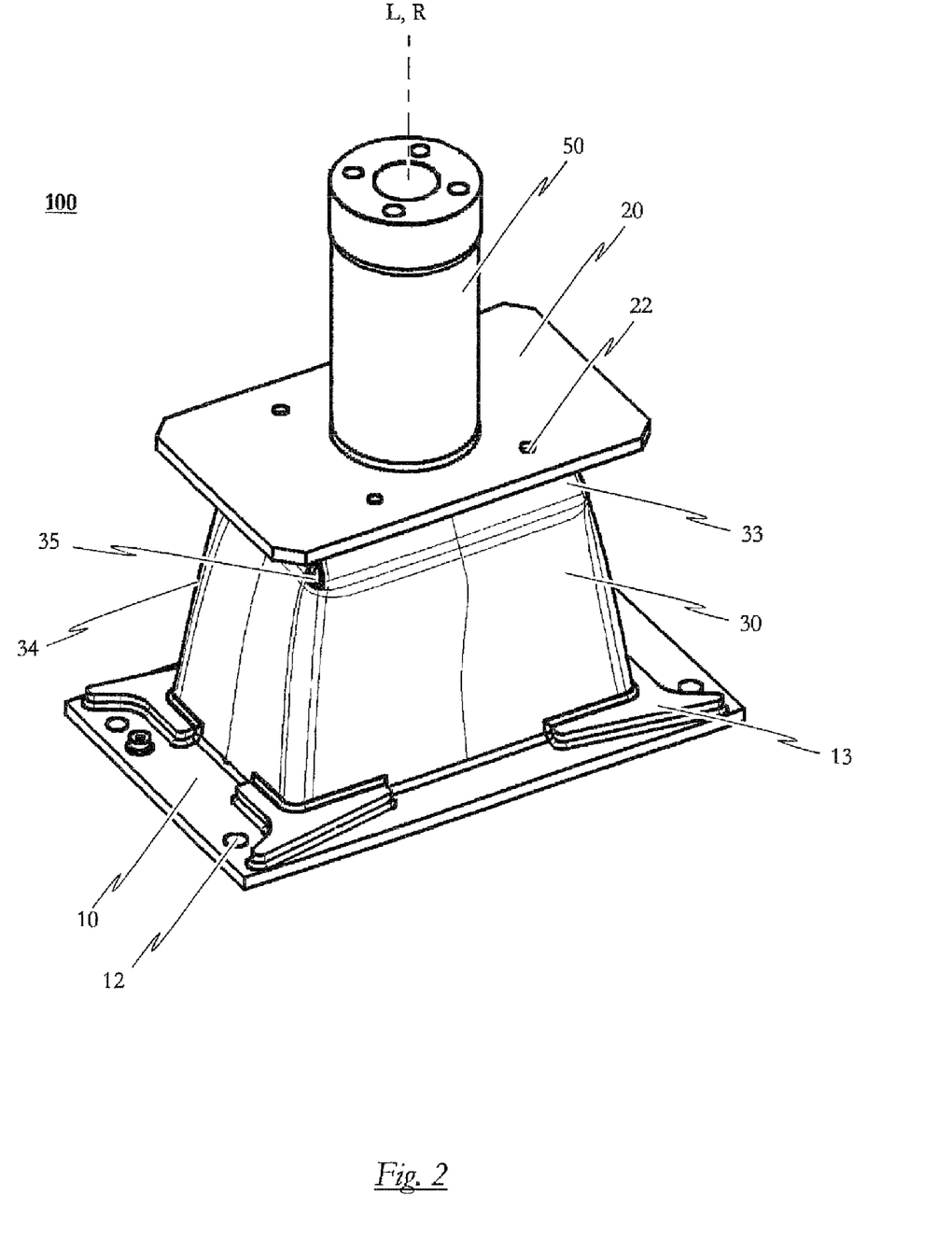
FIG. 2: a perspective view of the preferred embodiment of the energy dissipation device according to the invention.

As can especially be noted from FIG. 1, a total of two tractive force-transferring elements 31 are provided inside the energy dissipation element 30 configured as a hollow body which respectively connect the first end plate 10 to the second end plate 20. These tractive force-transferring elements 31 serve to transmit tractive forces in the longitudinal direction L of the energy dissipation device 100. Essential here is that the line of action W2 (cf. FIG. 4b) of the tractive forces transferred over the two tractive force-transferring elements 31 runs completely through the interior of the respective tractive force-transferring element 31.

Further recognizable from FIG. 1 is that the two tractive force-transferring elements 31 extend from different connecting lines in the preferred embodiment as depicted, whereby the resultant R of the two connecting lines coincides with the longitudinal axis L of the energy dissipation device 100. Specifically, the two connecting lines, along which the two tractive force-transferring elements 31 extend, are arranged transverse to the longitudinal axis L of the energy dissipation device 100. As set forth above, this measure enables pre-defining the flexural rigidity for the two tractive force-transferring elements 31 without the increased tensile strength of the energy dissipation device 100 from the two tractive force-transferring elements being influenced.

Although the two tractive force-transferring elements are configured in the form of tie rods in the embodiment of the energy dissipation device 100 as depicted, other designs can naturally also be considered such as, for example, rods, bars, cables, etc.

Figure 3A:
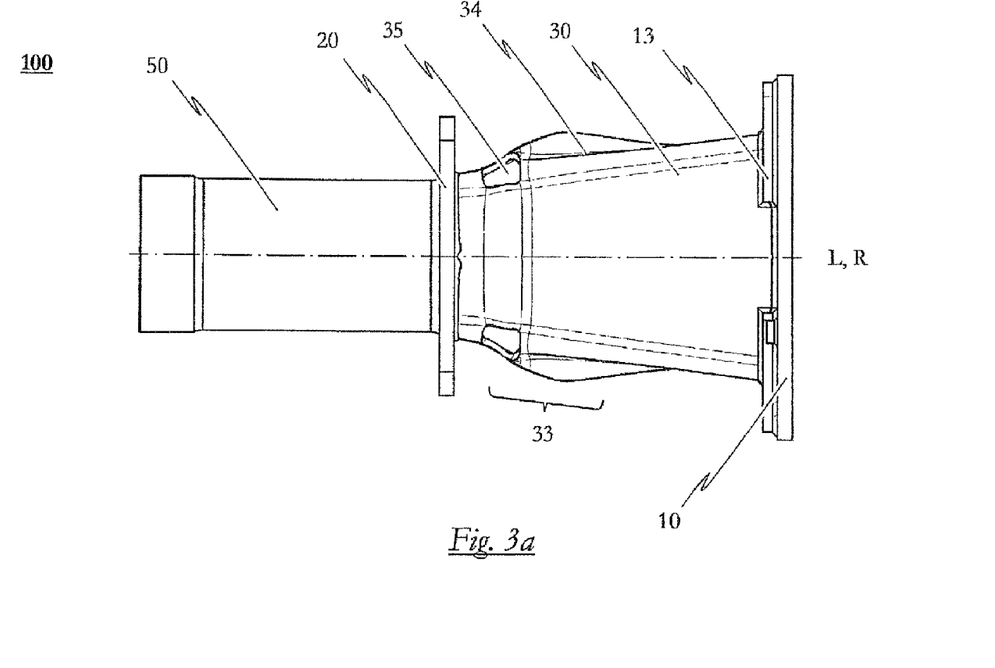
FIG. 3*a*: a side view of the preferred embodiment of the energy dissipation device according to the invention.
Figure 3B:
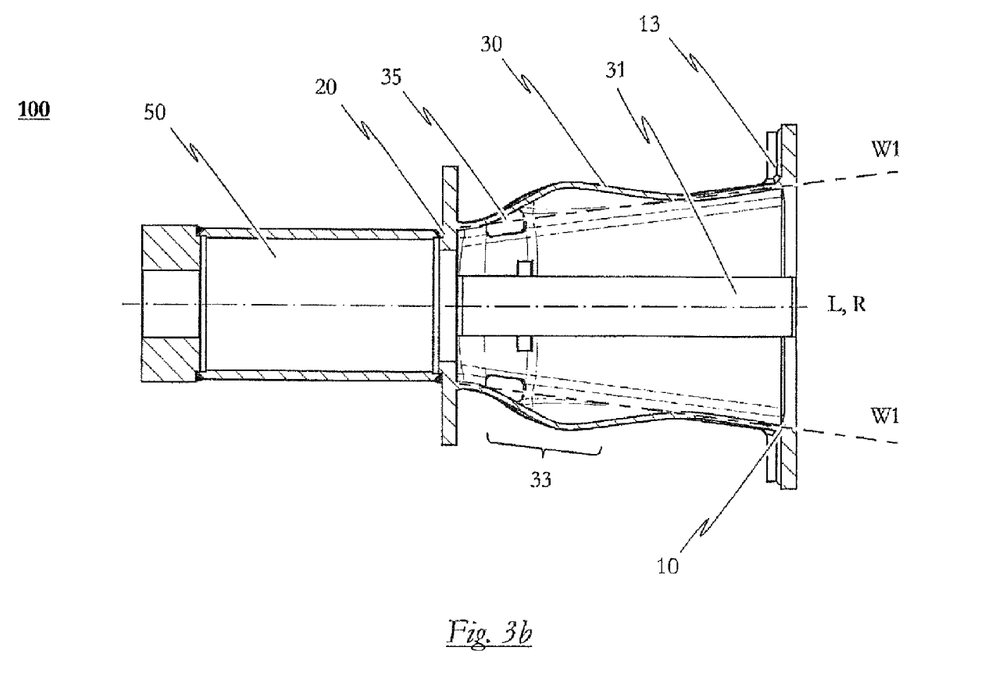
FIG. 3*b*: a side sectional view of the energy dissipation device according to the invention.
Figure 4A:
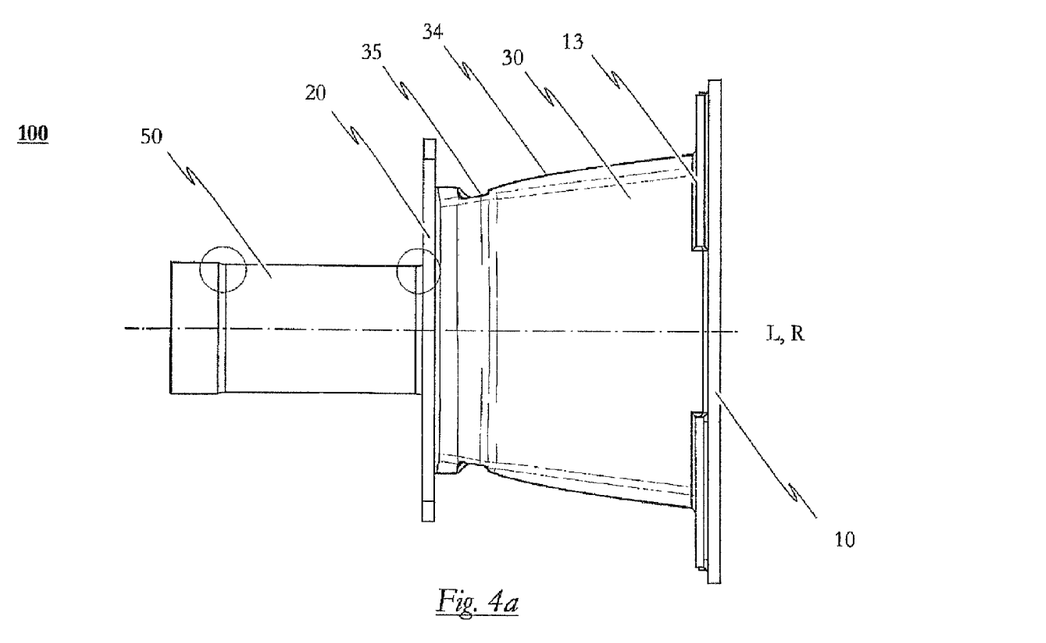
FIG. 4*a*: a top plan view of the preferred embodiment of the energy dissipation device according to the invention.
Figure 4B:
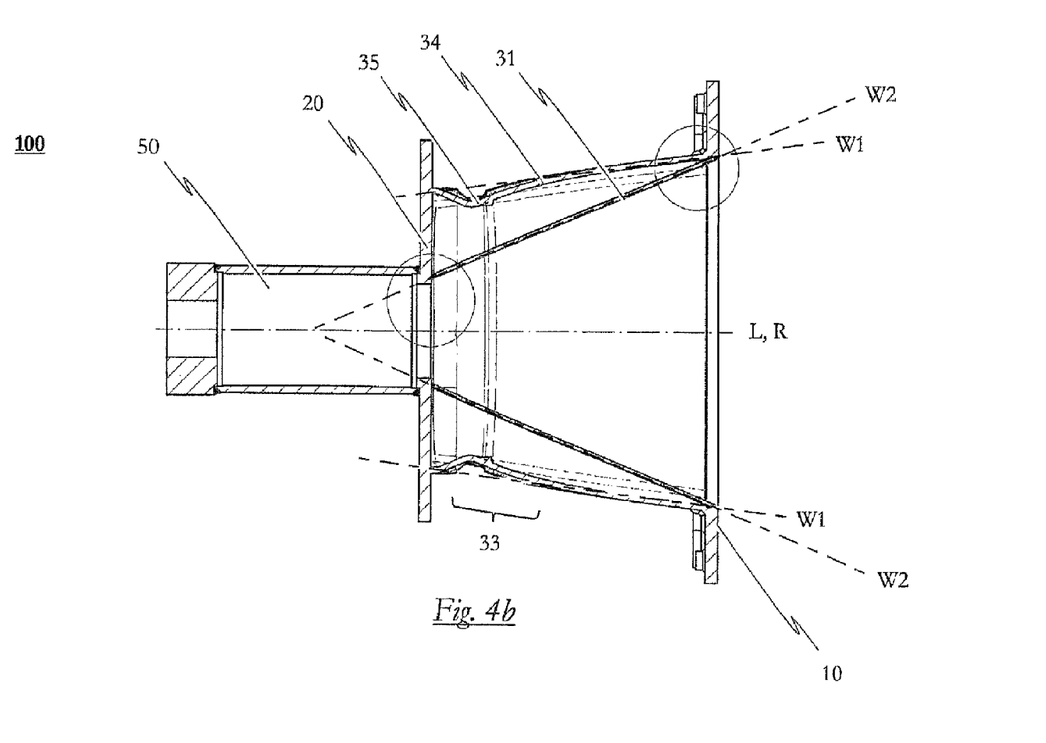
FIG. 4*b*: a top plan view of the preferred embodiment of the energy dissipation device according to the invention in sectional representation.

As can especially be noted from FIG. 3b, a hollow body is used in the preferred embodi-ment of the inventive energy dissipation device 100 for energy dissipation element 30 which is designed such that the line of action W1 for the compressive force transferred through the energy dissipation element 30—with the exception of the fold/bulge area 33—extends completely within the wall of the energy dissipation element 30 configured as a hollow body. This measure assures that the fold/bulge area 33, which is configured at least partly around the periphery of the hollow body 30 in the peripheral direction, is provided as the only geometrical imperfection in the energy dissipation element 30, so that a precisely adjustable response triggering for the formation of folds in the energy dissipation element 30 is then possible upon the characteristic response force for the energy dissipation device 100 being exceeded.

Different possibilities for configuring the fold/bulge area 33 in the walls of the hollow body 30 when manufacturing the energy dissipation device 100 are described in the following with reference being made to FIGS. 7 to 10.

Figure 7:
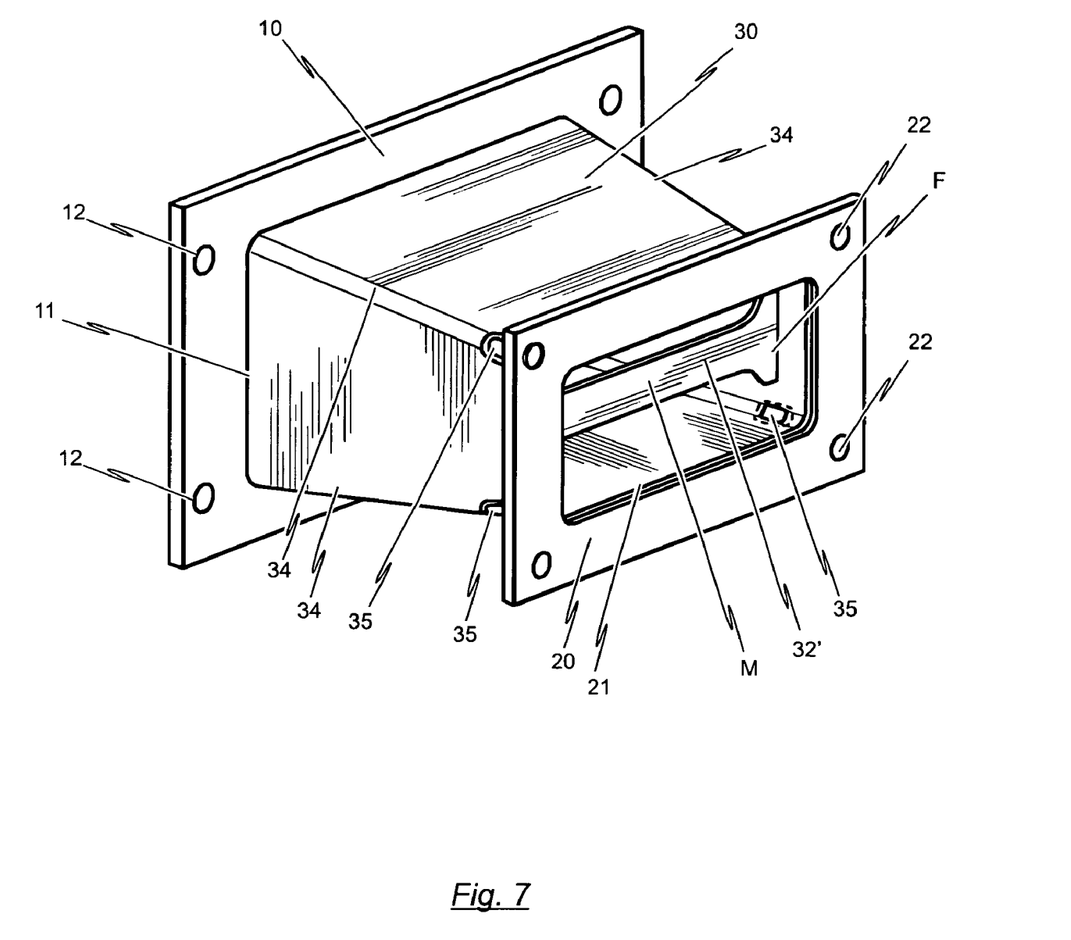
FIG. 7: a perspective view of an energy dissipation device prior to the formation of the fold/bulge area in the walls of the hollow body pursuant a first preferred embodiment of the inventive method for manufacturing the energy dissipation device.
Figure 8:
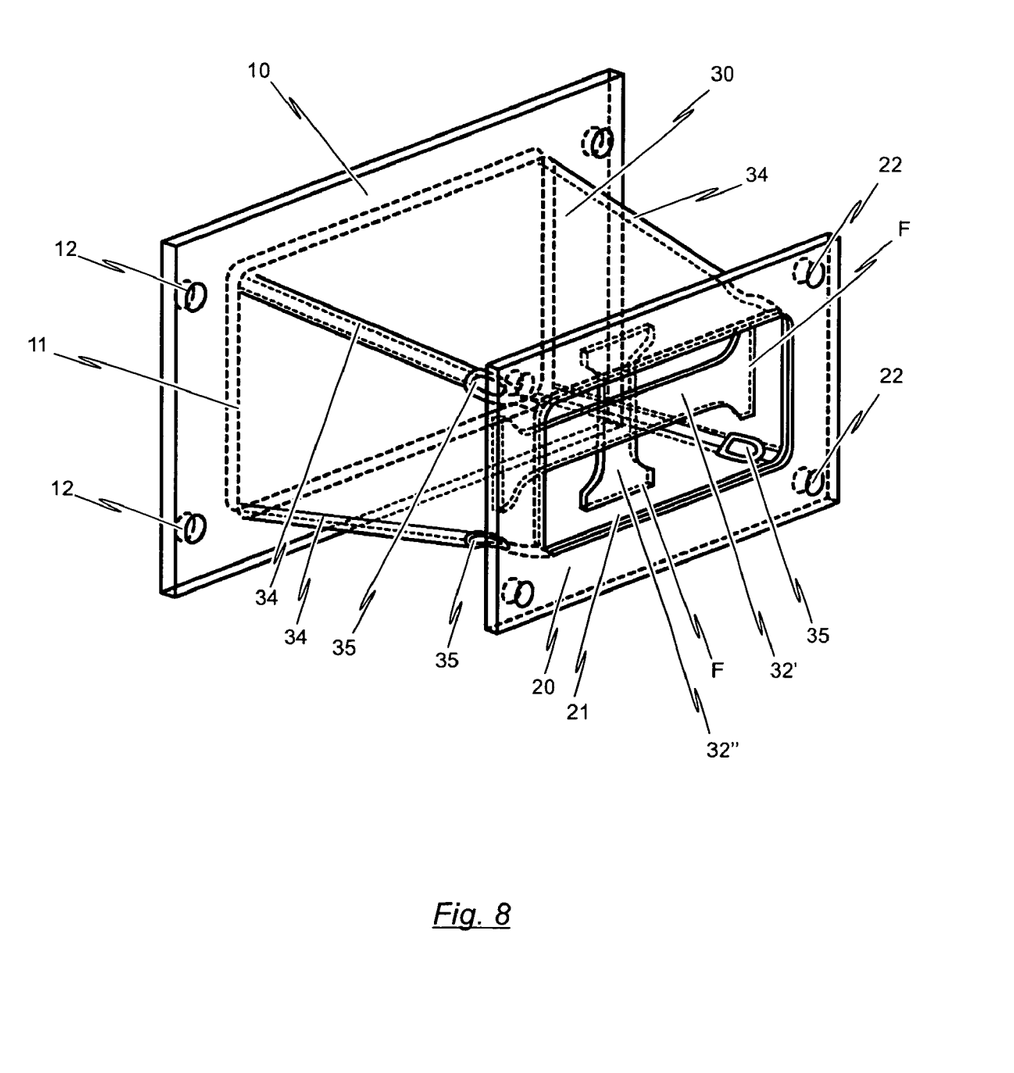
FIG. 8: a semi-transparent, perspective view of an energy dissipation device prior to the formation of the fold/bulge area in the walls of the hollow body pursuant a second preferred embodiment of the inventive method for manufacturing the energy dissipation device.

FIGS. 7 and 8 respectively show a state of the (not yet completely finished) energy dissipation device in which no fold/bulge area has yet been configured in the hollow body 30 and the energy dissipation device thus not yet provided with a response trigger. The procedure of forming the fold/bulge area 33 in hollow body 30 will subsequently be described below with reference to FIGS. 9a to 9c.

The embodiment depicted in FIG. 8 relates to a (likewise not yet completely finished) energy dissipation device exhibiting two traction elements 32', 32" in somewhat orthogonal alignment to one another, whereby each of the two traction elements 32', 32" is connected to the wall of the hollow body 30 at two oppositely-arranged fixing points F.

On the other hand, FIG. 7 shows an embodiment of the (not yet completely finished) energy dissipation device in which only one traction element 32' is provided for forming the fold/bulge area. This single traction element 32' is situated in a substantially horizontally-extending plane in FIG. 7, although other alignments are of course also conceivable for this traction element 32'.

Options for the defined forming of the response trigger will be subsequently described in the following with reference being made to FIGS. 9a to 9d. The mode of operation for the traction elements 32', 32" thereby used will likewise be explained in this context.

Figure 9A:
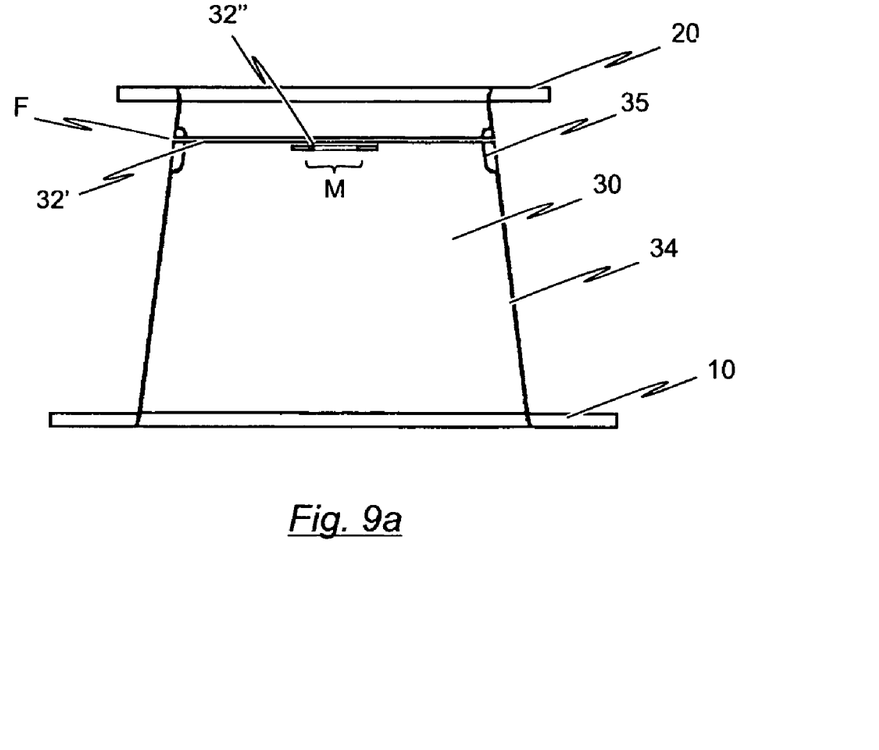
FIG. 9*a*: a longitudinally-sectioned representation of the energy dissipation device depicted in FIG. 8.

The hollow body 30 exhibits, as shown for example in FIG. 9a in a longitudinally-sectioned representation, a tapering form from the first end plate 10 toward the second end plate 20 in the form of a canted, truncated-pyramid body 30. The corresponding traction elements 32', 32" for forming the fold/bulge area 33 are thereby disposed in the truncated pyramid on the smaller cross-sectional end of the hollow body 30. The previously-cited cutouts or recesses 35 are further provided on the edges 34 of the hollow body 30 at the height of the traction elements 32', 32". It is pointed out that the (not yet completely finished) energy dissipation device shown in FIG. 9a to FIG. 9c sill has no tractive force-transferring elements 31. Such tractive force-transferring elements 31 are form-fit, integrally-bonded and/or force-fit after the fold/bulge area 33 has been formed accordingly with the respective end plates 10, 20.

In detail, FIG. 9a shows the energy dissipation device depicted perspectively in FIG. 8 in a longitudinally-sectioned representation. This representation particularly allows recognition of the position of the traction elements 32', 32" on the tapered end of the conically-tapering hollow body 30. The respective fixing points F for respectively affixing the traction elements 32', 32" at the respective positions on the inner wall of the hollow body 30 are provided at about the height of the cutouts 35 at the edges 34 of the truncated pyramid hollow body 30.

As an alternative hereto, however, it is also conceivable for the traction elements 32', 32" provided inside the hollow body 30 to be force-fit, integrally-bonded and/or form-fit connected to the outer wall of the connecting body 31 at two oppositely-arranged fixing points F, whereby the respective traction elements 32', 32" then run from the corresponding fixing points F through the appropriate openings provided in the wall of the hollow body 30.

It is to be noted at this point that the embodiments depicted in conjunction with FIGS. 9a to 9d can of course also apply to the embodiment depicted in FIG. 7 in which only one traction element 32' is used to form the fold/bulge area 33. Hence, the corresponding supplementary term of "optional" is utilized with respect to the corresponding compo-nents of FIGS. 9a to 9d as provided for the embodiment shown in FIG. 8 and not provided for the embodiment shown in FIG. 7.

Figure 9B:
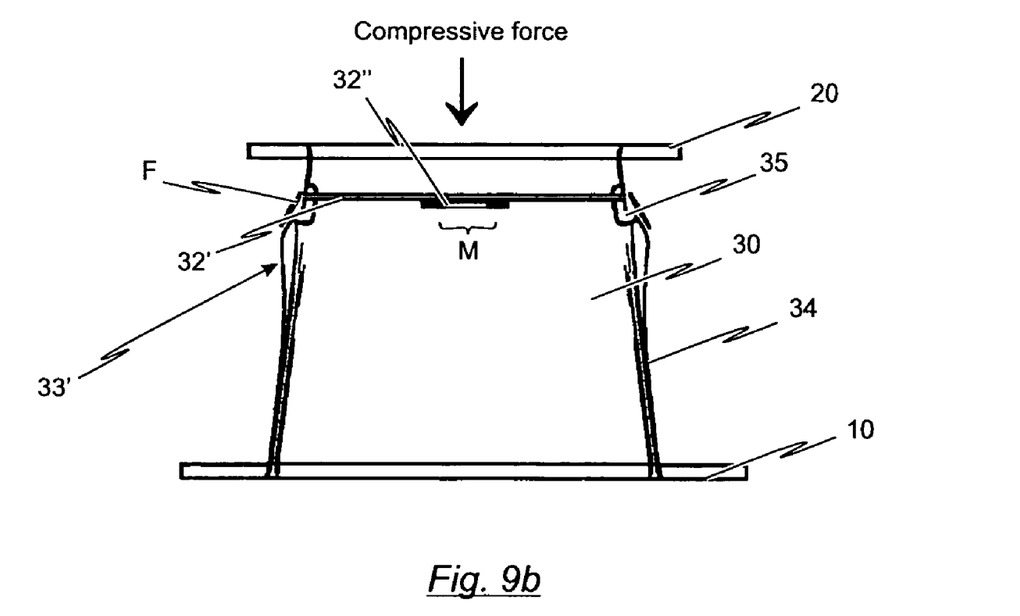
FIG. 9*b*: a longitudinally-sectioned representation of the energy dissipation device depicted in FIG. 9*a* after applying compressive stress onto the hollow body to form a bulge in the walls of said hollow body.

FIG. 9b shows the energy dissipation device 100 depicted in FIG. 9a in a state during the application or subsequent the application of a compressive stress onto hollow body 30. In this case, to form the bulge area 33' extending peripherally at least partly around the periphery of the hollow body 30, a compressive stress is applied to the hollow body 30 in its longitudinal direction. The amount of the compressive stress applied to the hollow body 30 is selected such that a bulge 33' occurs transverse to the load in a defined manner at least partly around the periphery of the hollow body 30. Since the edges 34 of the hollow body 30 represent reinforcements, the application of the compressive stress transverse to the load occasions a hammock effect, with which the lateral surfaces of the hollow body 30 plastically bulge outward and thus form the bulge 33'. The bulge 33' formed in this manner is a component of the response trigger for the finished energy dissipation device.

Figure 9C:
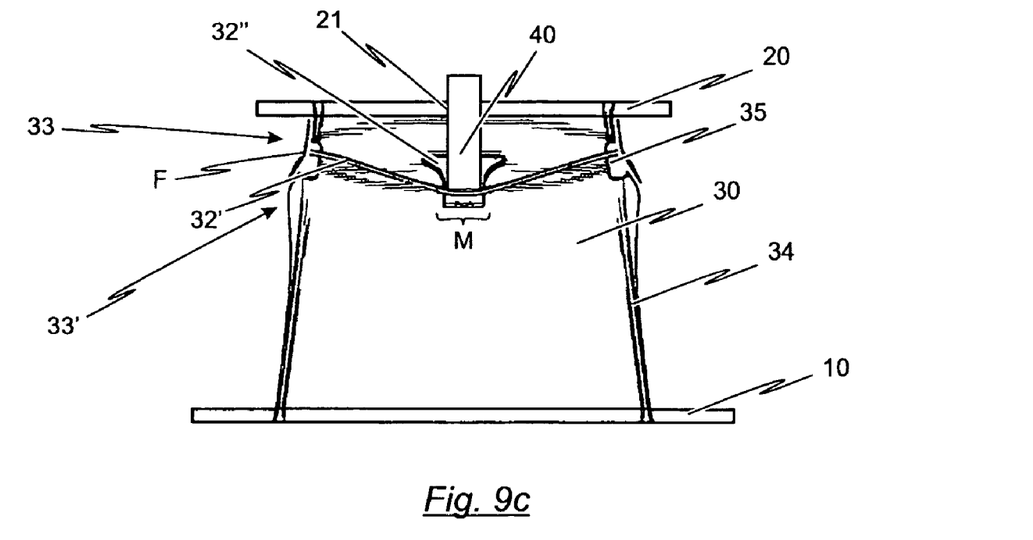
FIG. 9*c*: a longitudinally-sectioned representation of the energy dissipation device depicted in FIG. 9*a* with an advancing manipulator to form the fold/bulge area in the walls of the hollow body.

Subsequent the forming of the bulge 33', an indention 33 is further formed in the walls of hollow body 30, as will be explained in the following with reference to FIG. 9c. As FIG. 9c shows, the indentation 33 is formed in the wall of the hollow body 30 by the advancing of a manipulator 40. Specifically, the manipulator 40 to be advanced into the interior of the hollow body 30 exhibits a pin which is pushed through a corresponding opening 21 on the end face of the second end plate 20 in longitudinal direction L relative the energy dissipation device 100 such that it comes into contact with an area M situated between the oppositely-arranged fixing points F. In so doing, the area M of the respective traction elements 32', 32" situated between the oppositely-arranged fixing points F is thereby compressed by the manipulator 40, as a result of which the traction elements 32', 32" draw the side walls of the hollow body 30 inward at the respective fixing points F. An indentation 33 thus develops on each side of the hollow body 30 at which a fixing point F is provided for the traction element 32', 32".

This indentation 33 is—as is the above-described bulge 33'—configured such that the line of action W2 in the fold/bulge area 33, 33' no longer runs within the walls of the hollow body 30 upon the transmission of impact force. This indentation allows the predetermination of the position of the first fold in the truncated pyramid body 30 at each side as well as its direction of fold.

By the pushing of the respective traction elements 32', 32" or tractive element 32' being accordingly regulated by the advancing of the manipulator 40, the amplitude of the indentation 33 can be set. In the embodiment shown in FIG. 9a-d, the indentation 33 together with the bulge 33' forms the fold/bulge area utilized as the response trigger. Since, as mentioned above, the amplitude of both the indentation 33 as well as the bulge 33' is predefinable, the characteristic response force for the energy dissipation device 100 can be precisely adjusted when producing the energy dissipation element 30. It is evident that the amplitude of the indentation 33 will be that much greater and the response force for the energy dissipation element 30 that much smaller the stronger the respective traction elements is 32', 32", traction element 32' respectively, are pressed by the manipulator 40.

The indentation 33 forming after advancing of the manipulator 40 extends peripherally at least partly around the periphery of the hollow body 30 and exhibits a bulging direction toward the middle of the hollow body 30, whereby a triggering to prescribe the formation of folds for the hollow body 30 upon activation of the energy dissipation device 100 is provided additionally to bulge 33'.

Figure 9D:
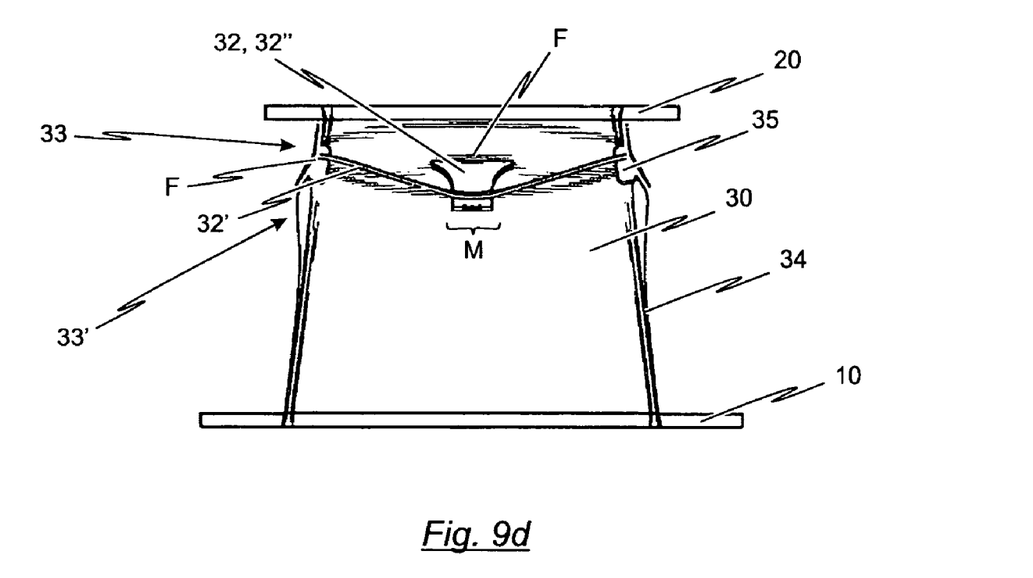
FIG. 9*d*: a longitudinally-sectioned representation of the energy dissipation device depicted in FIG. 9*a* after the formation of the fold/bulge area in the walls of the hollow body.
Figure 10:
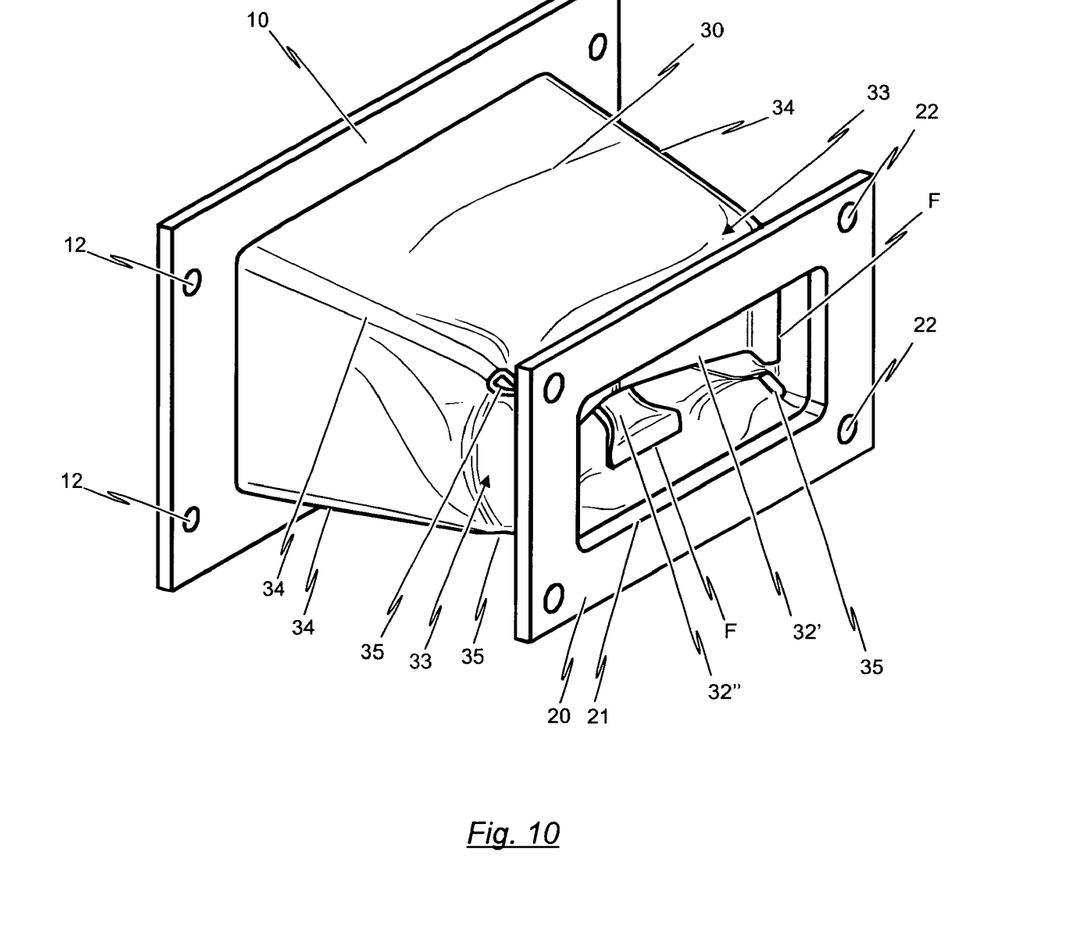
FIG. 10: a perspective view of the energy dissipation device shown in FIG. 9*c* prior to the removal of the traction elements from inside the hollow body.

FIGS. 9d and 10 show the energy dissipation device according to FIG. 9a in a longitudinally-sectioned, respectively perspective, representation, for the respective case of forming the fold/bulge area 33, 33' in the hollow body 30 on one hand through the exertion of compressive stress on the hollow body 30 and, on the other, the advancing of the manipulator 40 (cf. FIG. 9b and FIG. 9c), and according to which the triggering for prescribing the formation of folds in the hollow body 30 upon activation of the energy dissipation device 100 is thus formed. To be recognized hereby is that the recess 35 provided on each edge 34 of the hollow body 30 in the preferred embodiment is situated in the region of the fold/bulge area 33, 33'. These cutouts 35 on the edges 34 of the pyramid-like hollow body 30 serve to prevent the respective edge 34 from effecting natural reinforcements for the hollow body 30 at the height of the fold/bulge area 33, 33' and for the bulge 33' being precisely defined on the one hand by the exertion of compressive stress on the hollow body 30 and, on the other, the indentation 33 by the advancing of the manipulator 40. This in particular achieves reduction in stress load spikes upon the energy dissipation element 30 provided in the energy dissipation device 100 being triggered.

To manufacture the inventive energy dissipation device 100—based on the embodiment depicted in FIG. 9d or FIG. 10—it is now required to remove the traction elements 32', 32" from inside the hollow body 30 and correspondingly attach the appropriate tractive force-transferring elements 31 both to the first end plate 10 as well as the second end plate 20. This can ensue—as set forth above—by the tractive force-transferring elements 31 running through the interior of the hollow body 30, whereby it must be taken into consideration that upon a transmission of tractive force, the line of action W2 for the tractive force transferred over the tractive force-transferring element 31 runs entirely inside said tractive force-transferring element 31.

Note is to be made of the fact that realization of the invention is not limited to the embodiments as described in conjunction with the figures, but rather a plurality of variants are possible. In particular, the embodiment depicted in conjunction with FIG. 8 applies analogously to the realization shown in FIG. 7 which provides for only one traction element 32'. Also conceivable for the shape of the hollow body 30 are forms other than the depicted truncated pyramid profile. Moreover, the position of the response trigger at the tapered end of the conically-configured connecting body is not limited to the embodiment as shown in the figures.

What all the embodiments of the invention have in common is that at least one first indentation 33 extending peripherally at least partly around the periphery of the hollow body 30 is formed by means of the at least one traction element 32', 32", whereby this at least one first indentation 33 serves as the trigger for the prescribing of the formation of folds for the energy dissipation element 30 configured as a hollow body upon activation of the energy dissipation device 100.

In designing the fold/bulge area utilized as the response trigger, it is not mandatory for both the bulge 33' to be formed by the exertion of a compressive stress on the hollow body 30 as well as the indentation 33 to also be formed by the advancing of the manipulator 40. It is, of course, also conceivable for the response trigger to make use of either only the indentation 33 formed by the advancing of the manipulator 40 or only the bulge 33' formed by the exertion of a compressive stress on the hollow body 30.

It is furthermore evident that the fold/bulge area 33 is respectively situated in a region, respectively in the proximity, of the oppositely-arranged fixing points F at which the traction element 32', traction elements 32', 32" respectively, provided in the interior of the hollow body 30 is/are connected to said hollow body 30.

List of reference numerals

| | |
|---|---|
| 10 | first end plate/first joint plate |
| 11 | opening in first end plate |
| 12 | fixing means |
| 13 | limit stop |
| 20 | second end plate/second joint plate |
| 21 | opening in second end plate |
| 22 | fixing means |
| 30 | energy dissipation element/hollow body |
| 31 | tractive force-transferring element |
| 32', 32" | traction element/tie rod |
| 33 | indentation of the fold/bulge area (response trigger) |
| 33' | bulge of the fold/bulge area (response trigger) |
| 34 | edge of the hollow body |
| 35 | recess |
| 40 | manipulator |
| 50 | upstream element |
| 100 | energy dissipation device |
| F | fixing point |
| L | longitudinal axis of the energy dissipation device |
| M | center area of the traction element |
| R | resultant of the connecting lines |
| W1 | line of action for the compressive force transferred over the energy dissipation element |
| W2 | line of action for the tractive/compressive forces transferred over the tractive force-transferring element |

The invention claimed is:

1. An energy dissipation device for a multi-member vehicle, comprising a first end plate, a second end plate and an energy dissipation element in the form of a hollow body extending in the longitudinal direction of the energy dissipation device and arranged between the first and second end plates,
   wherein the energy dissipation element configured as a hollow body exhibits a canted profile,
   wherein the energy dissipation element further comprises a response trigger in the form of a fold/bulge area extending peripherally at least partly around the periphery of the hollow body,
   wherein the energy dissipation device further comprises at least one tractive force-transferring element which connects the first end plate with the second end plate and is designed to transfer tractive forces in the longitudinal direction of the energy dissipation device, wherein the line of action for the tractive force transferred over the at least one tractive force-transferring element runs completely through the interior of said tractive force-transferring element,
   wherein at least one edge of the energy dissipation element configured as a hollow body exhibits a recess which is at least partly situated in the fold/bulge area, and
   wherein the first end plate is configured as a first joint plate via which the energy dissipation device is detachably attachable to the main frame of a vehicle body of a multi-member vehicle.

2. The energy dissipation device according to claim 1, wherein the at least one tractive force-transferring element has a predefinable flexural rigidity.

3. The energy dissipation device according to claim 1 or 2 comprising at least two tractive force-transferring elements extending along different connecting lines, wherein the resultant of the connecting lines coincides with the longitudinal axis of the energy dissipation device.

4. The energy dissipation device according to claim 3, wherein the connecting line or connecting lines along which the at least one tractive force-transferring element extends, or along which the at least two tractive force-transferring elements extend respectively, run(s) transverse to the longitudinal axis of the energy dissipation device.

5. The energy dissipation device according to claim 1 or 2, wherein
the energy dissipation element is designed to transfer compressive forces up to a predefinable amount and characteristic for the response force of said energy dissipation element in the longitudinal direction of the energy dissipation device, and
the line of action for the compressive forces transferred through said energy dissipation element, with the exception of the fold/bulge area, extends completely within the walls of the energy dissipation element configured as a hollow body.

6. The energy dissipation device according to claim 1 or 2, wherein the energy dissipation element configured as a hollow body exhibits a tapering profile.

7. The energy dissipation device according to claim 6, wherein the energy dissipation element configured as a hollow body exhibits a profile tapering from the first end plate to the second end plate.

8. The energy dissipation device according to claim 7, wherein the energy dissipation element configured as a hollow body exhibits a truncated pyramid profile.

9. The energy dissipation device according to claim 1, wherein the second end plate is configured as a second joint plate via which a force transmission element, a buffer element or an additional shock absorbing element is connectable to said energy dissipation device.

10. A method for manufacturing an energy dissipation device as specified in claim 1 or 2, wherein the method comprises the following procedural steps:
a) providing a hollow body with a canted form;
b) attaching a first end plate to a first end face of the hollow body and a second end plate to an oppositely-arranged second end face of the hollow body;
c) forming a fold/bulge area to peripherally extend at least partly around the periphery of the hollow body, and
d) attaching at least one tractive force-transferring element both to the first end plate as well as to the second end plate such that the entire length of the at least one tractive force-transferring element is wholly situated on a connecting line connecting the first end plate with the second end plate,
wherein the procedural step c) further comprises the following procedural steps:
applying a compressive stress to the hollow body such that a bulge ensues peripherally transverse to the load in a defined manner at least partly around the periphery of the hollow body, and
wherein the method further comprises, subsequent procedural step c), the procedural step of removing the at least one traction element from the interior of the hollow body.

11. The method according to claim 10, wherein
the amount of the compressive stress applied to the hollow body is selected such that the bulge can be set at a definable amplitude.

12. The method according to claim 10, which further comprises the following procedural step prior to procedural step c):
attaching at least one traction element to the wall of the hollow body at two oppositely-arranged fixing points within the interior of said hollow body such that the at least one traction element extends transverse to the longitudinal direction of said hollow body and wherein the procedural step c) further comprises the following procedural step: advancing a manipulator into the interior of the connecting body such that the at least one traction element is preferably compressed concentrically and the two oppositely-arranged fixing points of the traction element are moved relative to one another.

13. The method according to claim 12, wherein
the two oppositely-arranged fixing points are situated in the interior of the hollow body, and wherein the at least one traction element provided within the interior of said hollow body is connected with the interior wall of the connecting body at fixing points.

14. The method according to claim 12, wherein
the two oppositely-arranged fixing points are situated external of the hollow body, and
the at least one traction element provided within the interior of said hollow body is connected with the outer wall of the connecting body at fixing points such that the at least one traction element extends from the respective fixing points through the appropriate openings provided in the wall of the hollow body.

15. The method according to claim 12, wherein
the manipulator to be advanced within the hollow body exhibits a pin which extends through a corresponding opening in the first or second end plate relative to the hollow body in the longitudinal direction of said hollow body upon the advancing of the manipulator and strikes an area situated between the oppositely-arranged fixing points of the at least one traction element.

16. The method according to claim 10, wherein
the amplitude of the fold/bulge area formed in procedural step c), and thus the characteristic response force for the energy dissipation element, is adjustable.

17. The method according to claim 10, wherein
the hollow body provided in procedural step a) is a hollow body with a truncated-pyramid form.

* * * * *